US008230019B2

(12) United States Patent
Keohane et al.

(10) Patent No.: US 8,230,019 B2
(45) Date of Patent: Jul. 24, 2012

(54) ALERTING ELECTRONIC MAIL USERS OF UNDELIVERABLE RECIPIENTS (75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2022 days.

(21) Appl. No.: 10/621,930

(22) Filed: Jul. 17, 2003

(65) Prior Publication Data
US 2005/0015450 A1  Jan. 20, 2005

(51) Int. Cl.
G06F 15/16 (2006.01)
(52) U.S. Cl. ......................................... 709/206; 709/215
(58) Field of Classification Search ........... 709/204–207
See application file for complete search history.

(56) References Cited

U.S. PATENT DOCUMENTS

| | | | | |
|---|---|---|---|---|
| 5,684,843 A * | 11/1997 | Furukawa et al. | ............ | 375/358 |
| 5,797,094 A * | 8/1998 | Houde et al. | ................ | 455/412.2 |
| 5,958,006 A * | 9/1999 | Eggleston et al. | ............ | 709/219 |
| 6,496,573 B1 * | 12/2002 | Ichimura | .................. | 379/100.06 |
| 6,618,749 B1 * | 9/2003 | Saito et al. | ..................... | 709/207 |
| 6,640,230 B1 * | 10/2003 | Alexander et al. | ..................... | 1/1 |
| 6,763,377 B1 * | 7/2004 | Belknap et al. | ............... | 709/223 |
| 6,782,414 B1 * | 8/2004 | Xue et al. | ....................... | 709/206 |
| 6,854,007 B1 * | 2/2005 | Hammond | .................... | 709/206 |
| 6,963,910 B1 * | 11/2005 | Belknap et al. | ............... | 709/223 |
| 6,963,993 B1 * | 11/2005 | Semancik et al. | ................. | 714/2 |
| 7,069,302 B2 * | 6/2006 | Saito et al. | ..................... | 709/206 |
| 7,117,259 B1 * | 10/2006 | Rohwer | ........................ | 709/223 |
| 7,302,470 B2 * | 11/2007 | Oizumi | ......................... | 709/206 |
| 7,505,974 B2 * | 3/2009 | Gropper | ................................ | 1/1 |
| 7,606,908 B2 * | 10/2009 | Arunkumar | ................... | 709/227 |
| 7,640,306 B2 * | 12/2009 | Appelman et al. | ............ | 709/206 |
| 7,814,068 B2 * | 10/2010 | McDonald et al. | ........... | 707/687 |
| 2002/0143879 A1 * | 10/2002 | Sommerer | .................... | 709/206 |
| 2003/0063326 A1 * | 4/2003 | Kiyono et al. | ................ | 358/440 |
| 2003/0084110 A1 * | 5/2003 | Shono | .......................... | 709/206 |
| 2003/0110223 A1 * | 6/2003 | Hamilton et al. | ............. | 709/206 |
| 2003/0164990 A1 * | 9/2003 | Watanabe | .................... | 358/402 |

(Continued)

OTHER PUBLICATIONS

"InfoDirect for OpenMail-Chapter 7: Advanced Mail List Management," via Internet at http://osnt1.openscope.com/Software.nsf/6af57c517a4700c78825675400745670/dd24ff30a..., dated Apr. 10, 2003, 14 pages.

(Continued)

Primary Examiner — Patrice Winder
Assistant Examiner — Tauqir Hussain
(74) Attorney, Agent, or Firm — Matthew B. Talpis; Gregory K Goshorn; Greg Goshorn, P.C.

(57) ABSTRACT

A mechanism to alert to a user that an address of an e-mail message may be undeliverable is provided. If a "bounced" mail notification is received, an indicator is associated with the address to which the notification pertains. When accessed by the user, in response to the indicator being set, the address is displayed in conjunction with one or more perceptive cues, such as highlighted color etc. If an indication that the delivery problems with respect to the address are resolved, such as receipt of an e-mail from the addressee or a successful delivery notification, the indicator is cleared whereby the alert is terminated.

6 Claims, 9 Drawing Sheets

U.S. PATENT DOCUMENTS

| | | | |
|---|---|---|---|
| 2004/0003283 A1* | 1/2004 | Goodman et al. | 713/201 |
| 2004/0006747 A1* | 1/2004 | Tyler | 715/530 |
| 2004/0010558 A1* | 1/2004 | Saito et al. | 709/206 |
| 2004/0030893 A1* | 2/2004 | Karamchedu et al. | 713/168 |
| 2004/0030916 A1* | 2/2004 | Karamchedu et al. | 713/200 |
| 2004/0030917 A1* | 2/2004 | Karamchedu et al. | 713/200 |
| 2004/0030918 A1* | 2/2004 | Karamchedu et al. | 713/200 |
| 2004/0083230 A1* | 4/2004 | Caughey | 707/104.1 |
| 2004/0172454 A1* | 9/2004 | Appelman et al. | 709/206 |
| 2007/0174402 A1* | 7/2007 | Tomkow | 709/206 |
| 2008/0065891 A1* | 3/2008 | Karamchedu et al. | 713/171 |
| 2010/0077049 A1* | 3/2010 | Appelman et al. | 709/206 |

OTHER PUBLICATIONS

"BigSender Administrator Guide," via Internet at http://www.craigrichards.com/software/bigsender/userguide/bounce.html, dated Apr. 10, 2003, 3 pages "Improved Online HTML Editor and Spell Check," *The Business of e-mail: Newsweaver*, via Internet at http://newsweaver.ie/bizofemail/e_article000136927.cfm, dated Apr. 10, 2003, 3 pages.

* cited by examiner

ALERTING ELECTRONIC MAIL USERS OF UNDELIVERABLE RECIPIENTS

TECHNICAL FIELD

The present invention relates in general to data processing systems, and in particular, for electronic mail client/server systems including mechanisms for automatically alerting a user, or users, to a potential undeliverable addressee.

BACKGROUND INFORMATION

E-mail processing in modern data processing systems is typically based on a client/server model. An e-mail client, usually deployed on a user's workstation or personal computer receives user input and generates an e-mail message which is typically transferred to the server (generically referred to as a mail transfer agent (MTA). The MTA then transfers the mail to one or more intermediate MTAs and ultimately to an MTA corresponding to the recipient of the e-mail message (as determined by the e-mail address of the addressee). Transfer of the e-mail message commonly uses the Simple Mail Transfer Protocol (SMTP).

In accordance with these e-mail protocols, if a destination is temporarily unreachable, the ingress MTA queues the mail and will attempt to retransmit the mail periodically. Typically a resend algorithm will attempt to resend mail every four hours for up to one week. If after that time the mail still fails, the retries are suspended and the undeliverable mail deleted.

Commonly, such systems will notify the sender that the mail failed and that retries will be attempted. However, a user may subsequently attempt to send e-mail to the same address. However, there is nothing to alert the user that the address may be problematic. Consequently, there is a need in the art for mechanisms to alert a user to a potential problem with an e-mail addressee.

SUMMARY OF THE INVENTION

The aforementioned needs are addressed by the present invention. Accordingly, there is provided in one embodiment a method for alerting e-mail users. If a failed delivery message is received, an indicator associated with an address of an addressee corresponding to a failed delivery message is set. In conjunction with the display of the address, a perceptive cue, such as visual highlighting and/or audible alert is provided. If there is a successful delivery of an e-mail to the address, the indicator is cleared. The indicator may also be cleared after a user-configurable time has elapsed. Additionally, an association may be established between the failed address and an optionally cached copy of the undelivered e-mail.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

A mechanism to alert to a user that an address of an e-mail message may be undeliverable is provided. If a "bounced" mail notification is received, an indicator associated with the address to which the notification pertains is set. When accessed by the user, in response to the indicator being set, the address is displayed in conjunction with one or more perceptive cues, such as highlighted color etc. If an indication that the delivery problems with respect to the address are resolved, such as receipt of an e-mail from the addressee or a successful delivery notification, the identifier is cleared whereby the alert is terminated. Additionally, an association may be established between the failed address and an optionally cached copy of the undelivered e-mail.

In the following description, numerous specific details are set forth such to provide a thorough understanding of the present invention. For example, particular e-mail transport protocols may be referred to, however, it would be recognized by those of ordinary skill in the art that the present invention may be practiced without such specific details, and in other instances, well-known circuits have been shown in block diagram form in order not to obscure the present invention in unnecessary detail. Refer now to the drawings, wherein depicted elements are not necessarily shown to scale and wherein like or similar elements are designated by the same reference numeral through the several views.

Figure 1A:
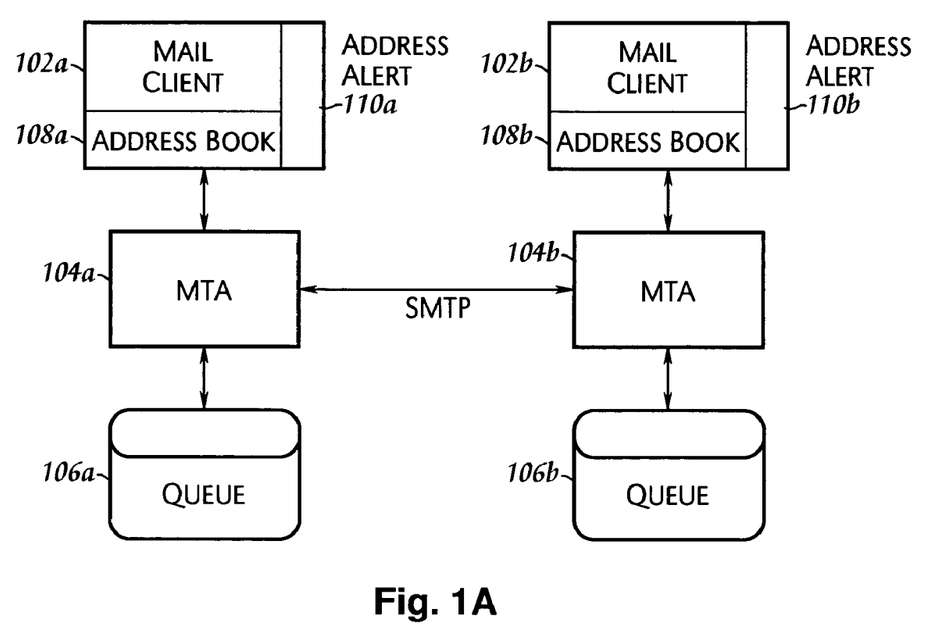
FIGS. 1A and 1B illustrate an architecture for e-mail messaging which may be used in conjunction with the principles of the present invention.

FIGS. 1A and 1B schematically illustrate e-mail exchange architecture which may be used in conjunction with the present invention. The e-mail exchange architecture illustrated in FIG. 1A includes mail clients 102A and 102B. A mail client typically provides the user interface to an e-mail exchange system. E-mail clients may be stand-alone applications such as Eudora, a well-known cross-platform e-mail client. Additionally, Unix and Unix-like platforms, such as Linux, provide e-mail clients such as Pine and Mutt. On Windows platforms, Microsoft Outlook includes an e-mail client. Messages generated by the user for transmission, typically via a network, to the mail addressee are sent to a Mail Transfer Agent (MTA). The architecture of FIG. 1, two MTAs, 104a and 104b are illustrated. MTAs queue e-mail messages for relay toward the destination. MTA 104a maintains queue 106a and MTA 104b maintains queue 106B. Mail is forwarded between MTAs, typically using the Simple Mail Transport Protocol (SMTP), which is an Internet standard defined in RFC2821. (A Request for Comments, or RFC, is the vehicle by which Internet standards are promulgated through the Internet Engineering Task Force (IETF).) Thus, an e-mail sent by a user of mail client 102a, for example, may generate an e-mail message addressed to the user of mail client 102b, such message may be transferred first to MTA 104a which may queue the message in queue 106a. The message may then be forwarded to MTA 104b which provides the egress mail server for mail client 102b. It would be appreciated by those of ordinary skill in the art that the architecture of FIG. 1A is exemplary, and in particular, the typical routing of an e-mail message may include the relay of the message by more than two MTAs.

Mail clients such as mail clients 102a and 102b may include an address book (108a, 108b) which may be viewed as a form of a database maintained by the mail client of recipient addresses entered by the user. An address book may be accessed by a user via a graphical user interface (GUI). Such embodiments are used in mail clients such as Eudora. Alternatively, a mail client may access the address book in response to a user keying in an addressee and a mail message being composed by the user in which the mail client performs address completion by comparing the entered keystrokes with entries in the address book. Exemplary implementations include an e-mail client incorporated in the Netscape Navigator browser and the Mozilla web browser. Additionally, mail clients 102a and 102b include address alert mechanism 110a and 110b, respectively. The operation of such an address alert mechanism, in accordance with the principles of the present invention, will be discussed hereinbelow in conjunction with FIG. 2.

Figure 1B:
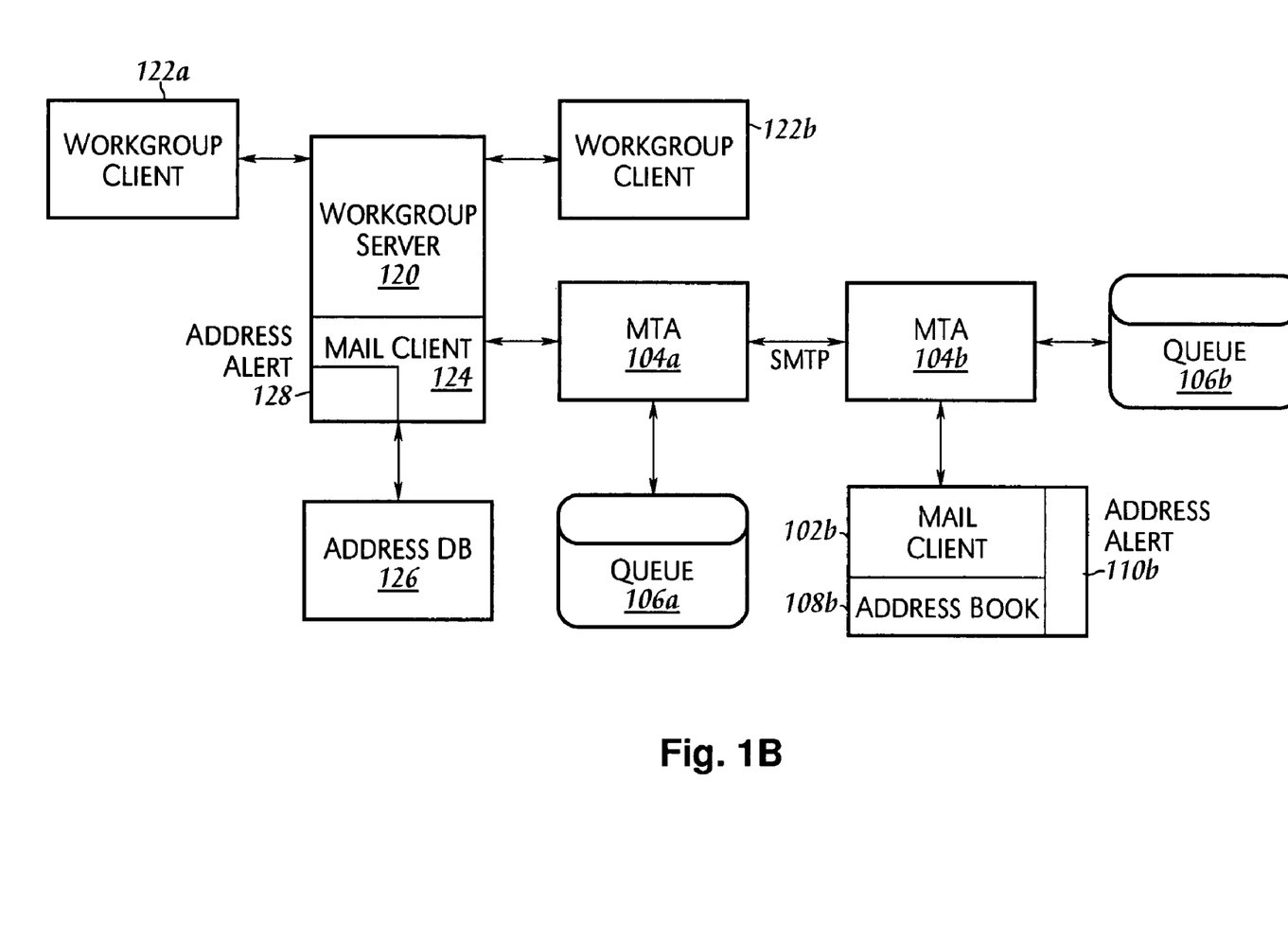

An alternative architecture based on the groupware application concept is illustrated in FIG. 1B. Workgroup applications provide shared applications for managing collaborative work projects including calendaring, discussion tracking, scheduling, database sharing and e-mail. (One such application is Lotus Notes, a product of IBM Corp., Armonk, N.Y.) In FIG. 1b, a workgroup server 120 provides such services to workgroup clients, such as workgroup client 122a and 122b. Workgroup server 120 includes a mail client 124 which interfaces to an address database 126. Address database 126 plays the role of individual address books in the embodiment illustrated in FIG. 1A. Address database 126 may include e-mail addresses for an entire workgroup, that is, e-mail addresses of addressees aggregated over all members of the workgroup. Mail client 124 forwards and receives mail for all members of the workgroup via MTA 104a which then relays the e-mail to recipients via MTA 104b as previously described. Mail client 124 includes address alert mechanism 128 which operates in similar fashion to address alert mechanisms 110a and 110b in FIG. 1a.

A mechanism for providing a user with an alert for problematic e-mail addressees, will now be described in conjunction with FIGS. 2-7. The present inventive principles include processes for tagging problematic addresses (FIG. 2), providing visual (or other cues) alerting a user to addresses that have experienced delivery problems (FIG. 3), sending e-mail, in conjunction with the address tagging (FIG. 4), and clearing an indicator on successful delivery of an e-mail message (FIG. 5). Note that these processes may be integrated into preexisting e-mail clients, or incorporated into a new client. The flowcharts provided herein are not necessarily indicative of the serialization of operations being performed in an embodiment of the present invention. Steps disclosed within these flowcharts may be performed in parallel. The flowcharts are indicative of those considerations that may be performed to produce the operation available to alert users to e-mail addresses that have experienced delivery problems. It is further noted that the order presented is illustrative and does not necessarily imply that the steps must be performed in order shown.

Figure 2:
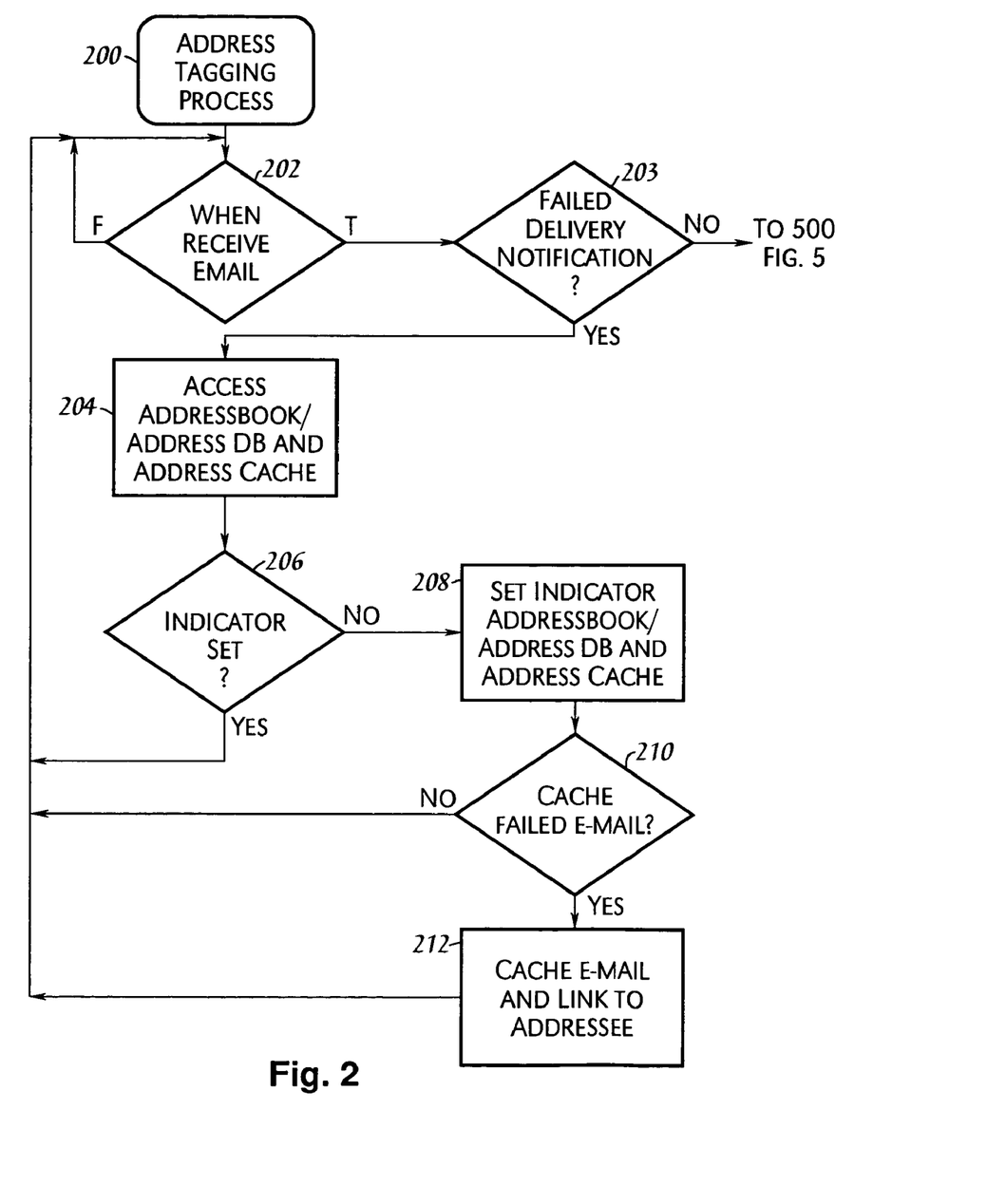
FIG. 2 illustrates, in flowchart form, a methodology for tagging an e-mail address having a delivery failure.

Refer now to FIG. 2, illustrating, in flowchart form, a process 200 for tagging a problematic e-mail address. In step 202, process 200 waits for the receipt of mail. When incoming mail is received, process 200 proceeds to step 202. Mail may be downloaded in response to a user command via a command line interface (CLI), or in a graphical user interface (GUI) based client, a menu selection or keystroke combination. Alternatively an e-mail client may be configured to periodically download e-mail from the MTA. The present inventive principles do not implicate the particular mechanism for downloading incoming mail from a server, and such techniques as are employed in the art may be used in conjunction with process 200. On receipt of an e-mail, in step 203, it is determined if the message is a failed e-mail delivery notification, that is, a notification of a "bounced" e-mail message. If so, process 200 proceeds to handle the setting of an address indicator corresponding to the recipient address (equivalently, addressee) of the failed e-mail message, described hereinbelow in conjunction with steps 204-212. Otherwise, if the e-mail message is originated from an addressee, process 200 proceeds to process 500, FIG. 5 to clear any indicators associated with addresses that may have become reachable.

Note that the operation in step 203 to determine the addressee of the "bounced" mail may be effected by parsing incoming mail for signatures indicative of a failed delivery. In particular, this may include parsing incoming e-mail for RFC1892-compliant failed delivery reports. RFC1892 defines an Internet standard for the use of the Multipart/Report content-type with respect to delivery status reports. For example, publicly available "bounced" mail parsers, written in Perl, may be found at the Comprehensive Perl Archive Network (CPAN) which is a central repository for Perl software (www.cpan.org). (Artisans of ordinary skill would recognize that Perl is a scripting language particularly adapted for text processing and available across platforms.) Such parsers may be adapted for use in conjunction with the present invention by forking a Perl process, or alternatively by embedding Perl into the source code for the preexisting client. (Both are established techniques in the programming art.) Using these resources in an embodiment of the present invention to determine failed delivery messages may advantageously exploit the regular expression capabilities available in Perl. The parser also returns the failed mail address.

As described above in conjunction with FIG. 1, a mail client may maintain an address book or database of e-mail addressees typically set up by the user and accessible via a GUI or other interface to enter the address into a message. Typically, an e-mail client also maintains an address cache, that is, a temporary store of recently used addresses. In accordance with the present inventive principles, each address book entry, address database entry and address cache entry may include an indicator which may be set if an e-mail to that addressee "bounces." The indicator may be, for example a timestamp reflecting the time the delivery failure notification is received by the mail client. A default timestamp of zero, or similar such value, which may be referred to as a null value, may be used to denote that the associated address has not had returned e-mail. (From a logical viewpoint, the address book, address data base and address cache are a set of data structures, each of which includes an address member, and optionally other members, such as an alias. The indicator may be an additional member.) Alternatively, a list of bounced mail addresses and associated timestamps may be maintained by the client. The particular form of the data structure by which problematic mail addresses are maintained by the mail client do not implicate the present inventive principles, and such alternative structures that may be used in the data processing art would fall within the spirit and scope of the present invention.

In step 204, the address cache, and address book or address database, in accordance with the e-mail system architecture is accessed for the failed mail address. In step 206, the corresponding indicator is tested, and if not set, the indicator is set in step 208.

In step 210, it is determined if the failed e-mail is to be cached. This may be a user-selected option via a GUI preferences panel, command-line option or similar technique. Additionally, the user may specify a time interval after the expiration of which the bounced mail is deleted from the cache. The failed message may be cached and associated with the address entry in the address book or address database. For example, the undelivered mail may be saved in a folder with the associated address keying folder. In this way, the user has a record of the e-mail that was not delivered. If the failed message is to be cached, in step 212 the e-mail is cached and associated with the address, for example by including a reference to the address data structure in the corresponding cache entry. This may then be used to peruse the cached bounced mail, as described in conjunction with FIG. 6, below. Note also that typical e-mail clients save sent messages in a folder, and the saved copy of a bounced message may similarly be associated with the failed delivery address in the address book, address cache, or bounced mail address list. This may be used to display a list of failed delivery addresses associated with the saved bounced mail, as described in conjunction with FIG. 7, below.

Returning to step 206, If the indicator is set, indicating that another e-mail to that address has failed, and a successful delivery to that address has not intervened (as discussed further below), process 200 returns to step 202 to continue to test for failed e-mail messages.

Figure 3:
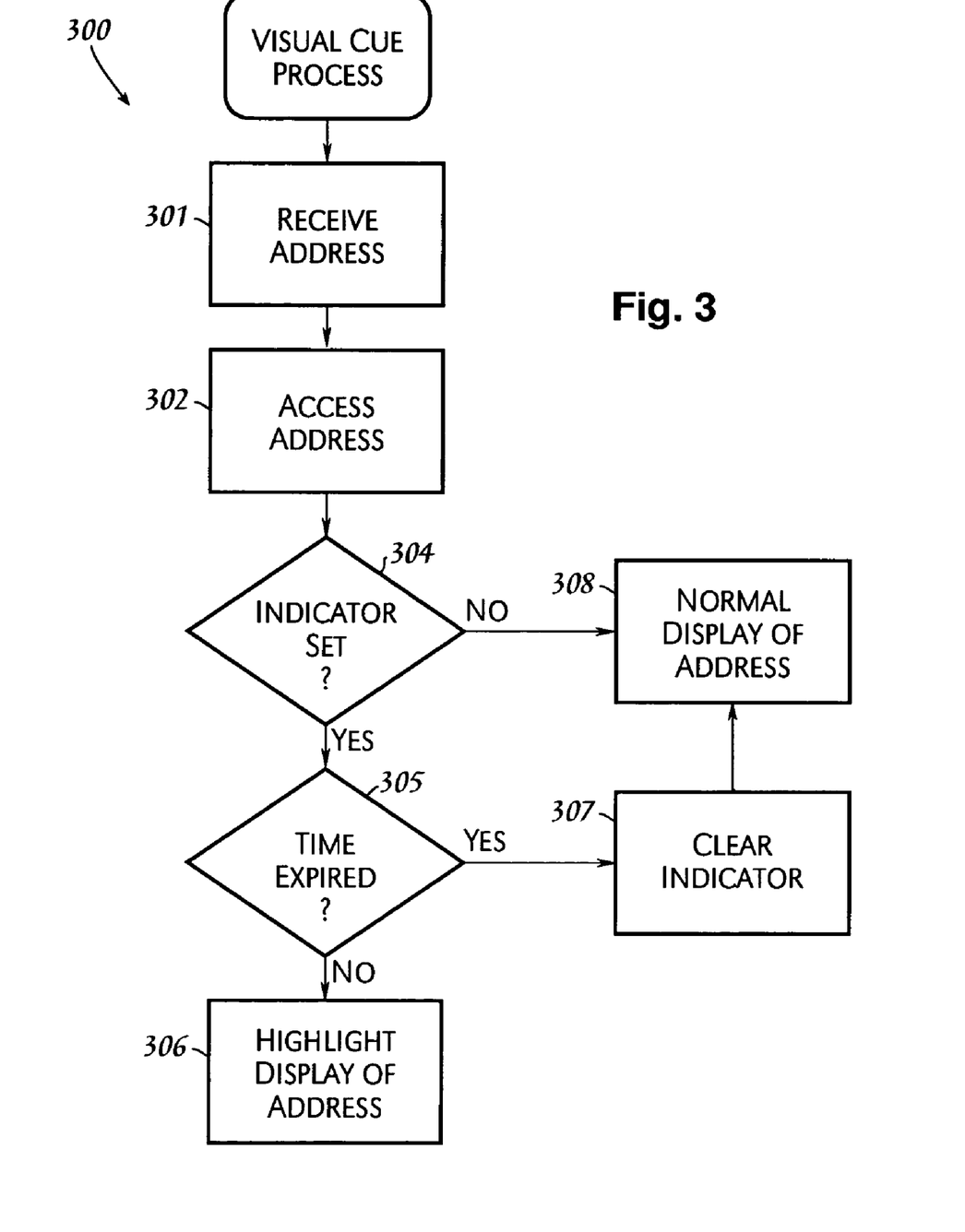
FIG. 3 illustrates, in flowchart form, a methodology for providing a user with an alert with respect to a problematic e-mail address which may be used in conjunction with the methodology of FIG. 2.

Refer now to FIG. 3 illustrating a visual cue process 300 which may be used to provide a visual alert to a user of a potential problem with an e-mail address. In step 301 an e-mail addressed is received. The source of the address may be in the body of an e-mail message currently open, that is, being displayed by the user. Alternatively, the address may be returned by user input events, for example a mouseover event when the user views an address book, address cache, or by capturing an address entered by the user in an address field in an e-mail message window. Additionally, process 300 may be configured to receive, via an interprocess communication (IPC) an address from another application. One such example may be a web browser. Present web browsers may include an e-mail address parser, or be adapted to do so. (E-mail address parsers written in Perl are available from CPAN.) An e-mail address contained in a web page may be passed to process 300. In this way, such an address may be displayed with a visual cue if e-mail addressed thereto has bounced.

In step 302, the address received in step 301 is accessed in the address book, address cache, or more generally the address database, or in a bounced mail address list in an embodiment of the present invention using such a list.

In step 304, the indicator associated with the address indicating if an e-mail message to that address has failed delivery is tested. Recall, the indicator may be a timestamp, having a nonzero value if the associated address has had problematic mail delivery. The timestamp may, be used to clear the indicator after the expiration of a preselected time interval. Note that the interval may be user configurable. Typical e-mail clients provide mechanism for setting user preferences such as an options or preferences dialog pane (in GUI-based clients, such as Microsoft Outlook, or Eudora) or a configuration file (in CLI-based clients, such as Mutt).

If, in step 304, the indicator is set, in step 305, the value (i.e. the timestamp) is compared with the current time. If in step 305, the elapsed time does not exceed the preselected time interval, the display of the address is highlighted, for example, by changing the color or font, changing the background color or other similar device in the data processing art used to distinguish elements in a display, step 306.

Additionally (not shown in FIG. 3), an audible or similar non-visual alert may be provided, however, it would be appreciated that such an alert mechanism would be transient. Collectively, visual, audible or other such cue may be referred to as a perceptive cue.

Conversely, if in step 305 the elapsed time exceeds the preselected value, the indicator is cleared, step 307. The address is displayed normally in step 308.

Returning to step 304, if the indicator is not set, (the timestamp is zero, for example) indicating that the address is not problematic, the address is displayed normally, step 308.

Figure 4:
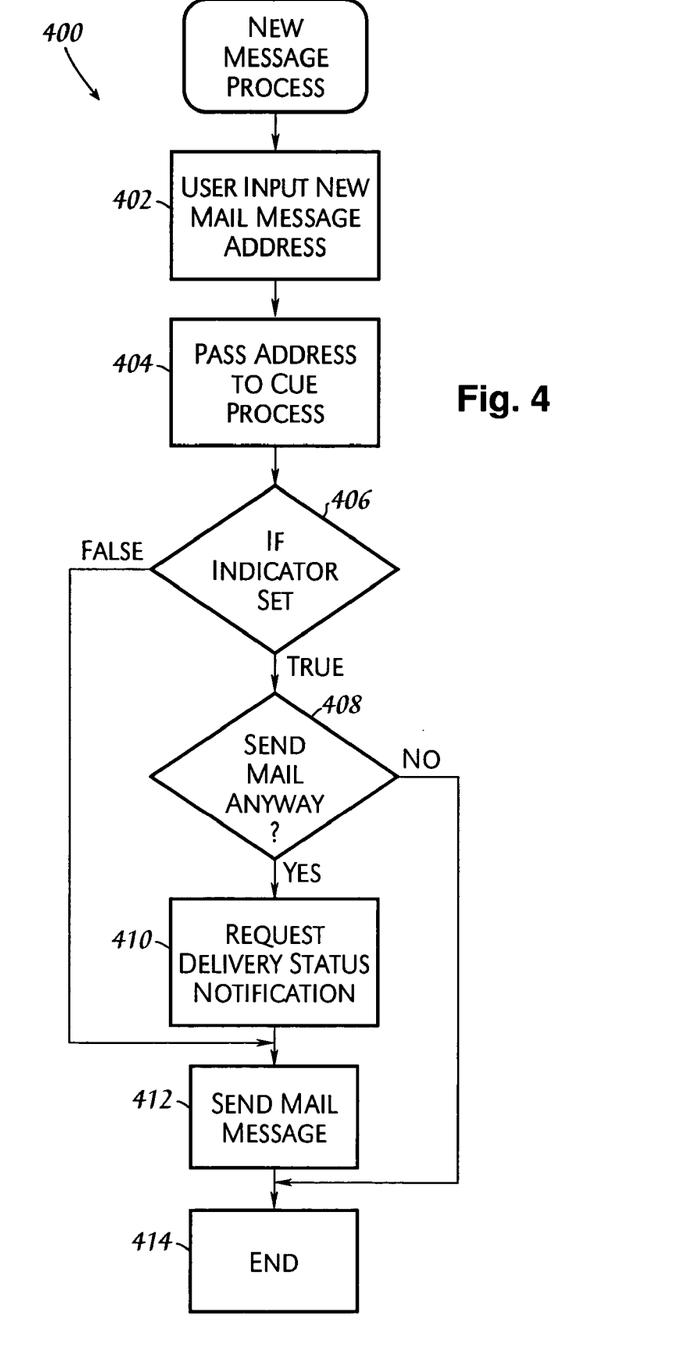
FIG. 4 illustrates, in flowchart form, a methodology for sending e-mail, in conjunction with providing the user alert of FIG. 3.
Figures 5, 6:
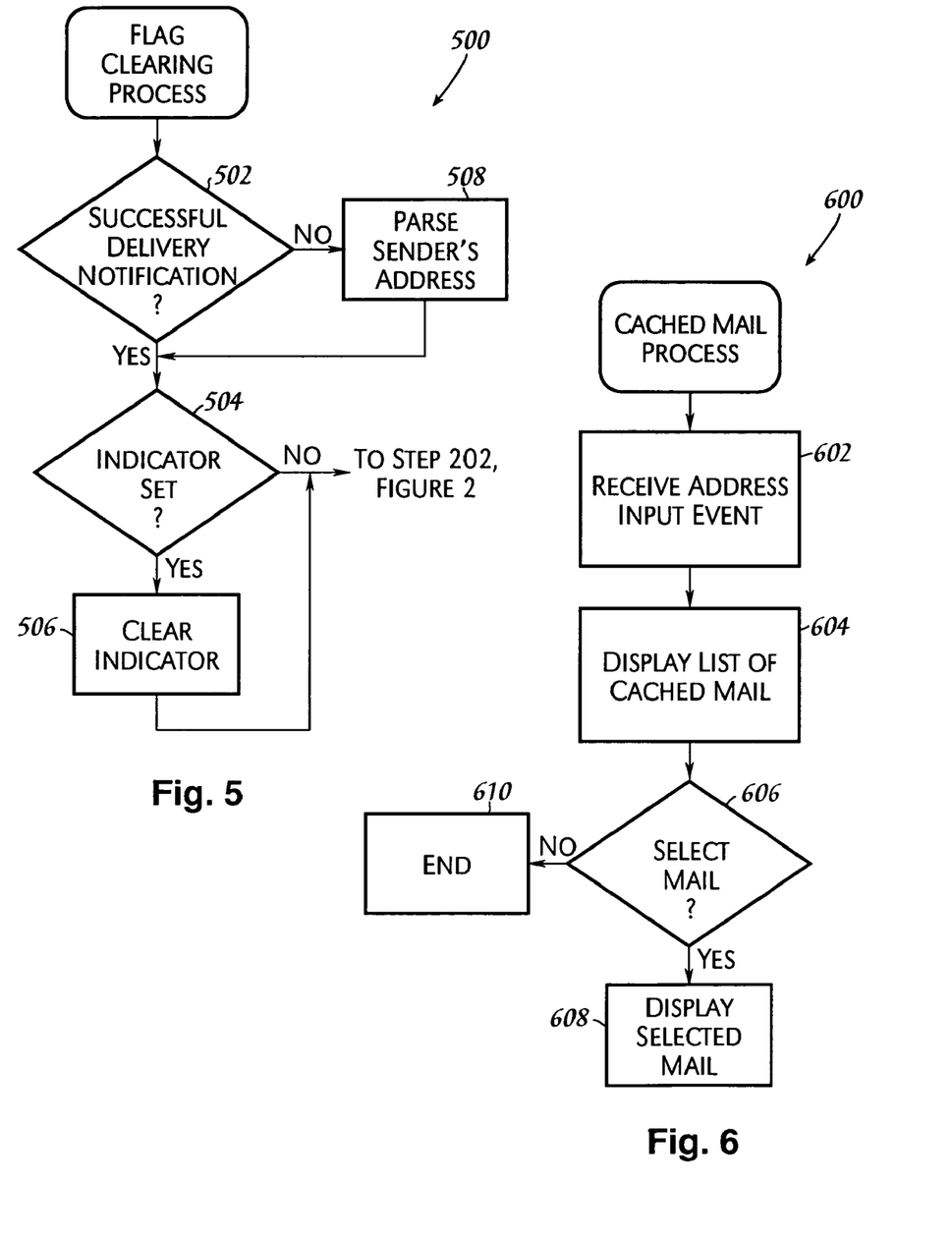
FIG. 5 illustrates, in flowchart form, a methodology for clearing address indicators that may be used in conjunction with the methodology of FIG. 2.
FIG. 6 illustrates, in flowchart form, a methodology for viewing cached returned e-mail in accordance with an embodiment of the present invention.

Refer now to FIG. 4 illustrating a process for sending a new mail message in association with the problematic address alert mechanism of the present invention. In step 402 the address of the new mail message is received via user input which may be via an address book selection or other GUI, or command line interface as previously noted. In step 404, the address is passed to a cue process as described in conjunction with step 301, FIG. 3. In this way, the entered address is highlighted as described hereinabove.

Additionally, in step 406, if the address indicator is set, in step 408 it is determined if the user elects to send the mail message. For example, a user prompt may be displayed in an e-mail client having a GUI for example by "pressing a send or cancel button," or, alternatively via a command line parameter, for example. If the user has elected to send the message, in step 410 a delivery status notification is requested. Additionally, a delivery status notification may be automatically triggered if the e-mail is sent to an addressee in the same host as the undelivered mail. A delivery status notification (DSN) in accordance with the SMTP service extension for delivery status notifications, RFC1891. A DSN is commonly known as a return receipt.

In step 412, the mail message is sent, typically using the aforementioned SMTP process discussed above in conjunction with FIG. 1. Process 400 terminates in step 414.

Returning to step 406, if the indicator associated with address entered by the user is not set, the e-mail is sent as previously discussed.

When delivery to a problematic addressee is resolved, alerts with respect to that address may be removed. FIG. 5 illustrates a clearing process 500 for resetting the address indicators and thus removing highlighting upon display of the corresponding address. Recall that process 500 may be invoked via step 203, FIG. 2.

In step 502, it is determined if the contents of the message are a successful delivery notification. This may be determined by parsing the message as described in conjunction with step 202, FIG. 2. In particular, the aforementioned Perl process for parsing delivery status reports may be adapted for use in conjunction with step 502. Additionally, the parser may return the recipient address of the message to which the successful delivery notification report pertains. The indicator associated with that address is tested in step 504 and if the indicator is set, the indicator is cleared in step 506.

If, however, in step 504 the received e-mail was not a successful delivery notification but an incoming e-mail message, in step 508 the sender's address is parsed, and using that address, it is determined if the corresponding indicator is set, step 504. If so, the address is cleared in step 506. In this way, the successful receipt of a message from a previously problematic addressee may be used to remove an alert with respect to that recipient.

If, in either the case of a successful delivery notification or the receipt of an e-mail message from a particular addressee, and it is determined in step 504 that the indicator is not set, process 500 returns to step 202, FIG. 2.

In FIG. 6, a methodology for viewing cached bounced mail messages is illustrated in flowchart form. In step 602, an input event for a highlighted e-mail address is received. Such an event may, for example, be a mouseclick on a highlighted address. In response, in step 604, a list of cached failed delivery e-mail is displayed. If an e-mail is selected from the list, step 606, the selected e-mail is displayed is step 608. If no e-mail is selected, process 600 terminates in step 610.

Figure 7:
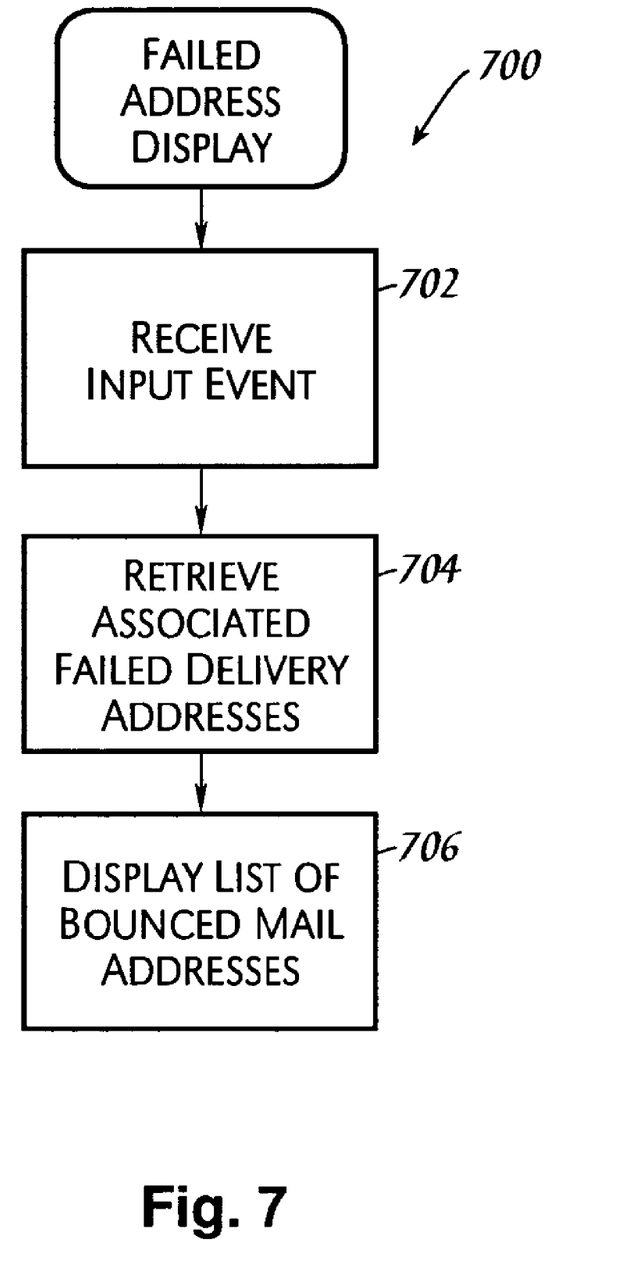
FIG. 7 illustrates, in flowchart form, a methodology for displaying failed addresses in accordance with an embodiment of the present invention.

In FIG. 7, a methodology for viewing the failed delivery addresses associated with a bounced e-mail message is illustrated in flowchart form. In step 702, an input event for a bounced e-mail is received. Such an event may, for example, be a "mouseover" on the e-mail file in a sent mail folder, for example. In response, to the event, the reference(s) to the associated failed delivery addresses in the address book, address cache or address list, depending on the particular embodiment is used to access the address(es) in step 704. In step 706, a list of the failed delivery (bounced) addresses is displayed, for example in a popup window.

Figure 8:
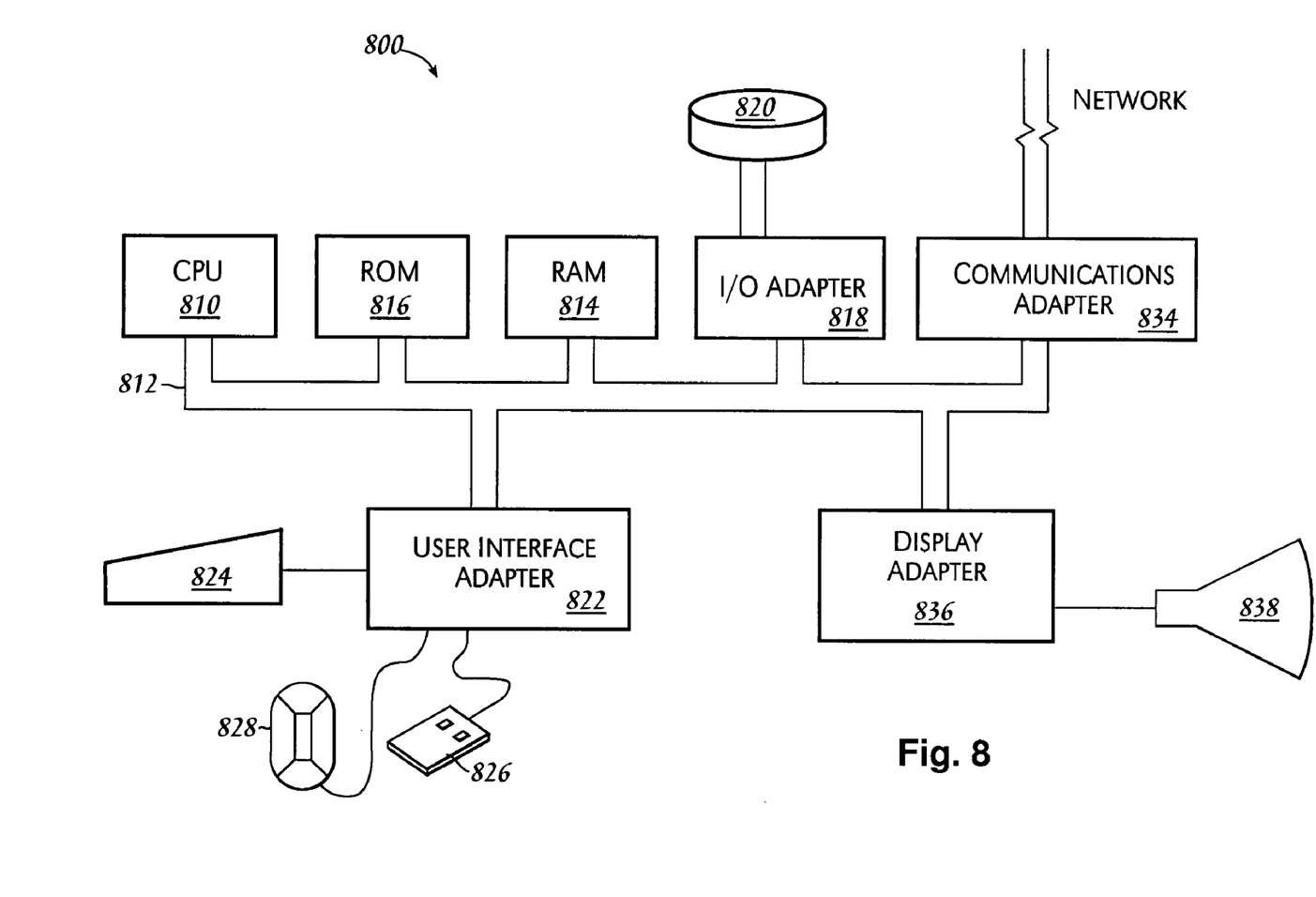
FIG. 8 illustrates, in block diagram form, a data processing system which may be used in conjunction with the methodologies incorporating the present inventive principles.
Figure 9:
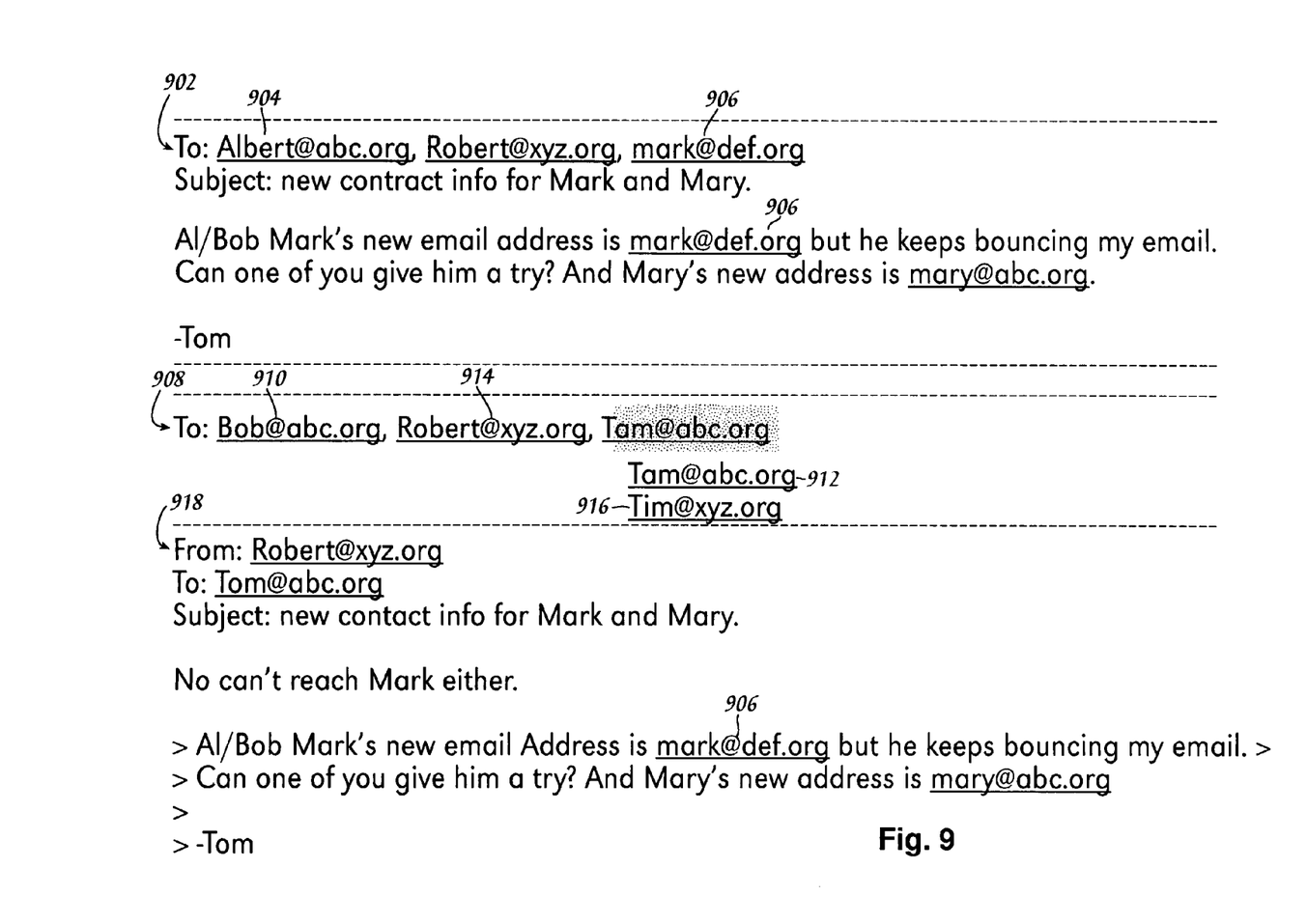
FIG. 9 illustrates exemplary displays of problematic e-mail addresses in accordance with the present inventive principles.

FIG. 8 illustrates an exemplary hardware configuration of data processing system 800 in accordance with the subject invention. The system in conjunction with the methodologies illustrated in FIGS. 2-7 may be used provide an address alert associated with problematic e-mail addresses in accordance with the present inventive principles. Data processing system 800 includes central processing unit (CPU) 810, such as a conventional microprocessor, and a number of other units interconnected via system bus 812. Data processing system 800 also includes random access memory (RAM) 814, read only memory (ROM) 816 and input/output (I/O) adapter 818 for connecting peripheral devices such as disk units 820 to bus 812, user interface adapter 822 for connecting keyboard 824, mouse 826, trackball 832 and/or other user interface devices such as a touch screen device (not shown) to bus 812. System 800 also includes communication adapter 834 for connecting data processing system 800 to a data processing network, enabling the system to communicate with other systems, and display adapter 836 for connecting bus 812 to display device 838. CPU 810 may include other circuitry not shown herein, which will include circuitry commonly found within a microprocessor, e.g. execution units, bus interface units, arithmetic logic units, etc. CPU 810 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 814 of one or more computer systems configured generally as described above. These sets of instructions, in conjunction with system components that execute them may alert a sender of an e-mail of a problematic address as described hereinabove. Until required by the computer system, the set of instructions may be stored as a computer program product in another computer memory, for example, in disk drive 820 (which may include a removable memory such as an optical disk or floppy disk for eventual use in the disk drive 820). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention s defined by the appended claims.

What is claimed is:

1. A method for alerting e-mail users comprising:
when a failed delivery e-mail message, corresponding to a first e-mail message, is received, setting an indicator in an entry in one of an address book, an address database, and an address cache associated with an address of an addressee corresponding to the first e-mail message;
displaying said address in conjunction with a perceptive cue in response to said indicator being set;
wherein, when said indicator is set, said indicator is operable for clearing in response to said address becoming accessible; and
clearing said indicator in response to subsequently receiving a second e-mail message originating from the address of the addressee corresponding to the failed delivery message, wherein the second e-mail message does not correspond to the first e-mail message; and
clearing said indicator in response to the expiration of a preselected time interval corresponding to a difference between a current time and a time corresponding to the setting of the setting of the indicator.

2. A computer program product embodied in a non-transitory storage medium, the program product for alerting e-mail users comprising programming instructions for:
when a failed delivery e-mail message, corresponding to a first e-mail message, is received, setting an indicator in an entry in one of an address book, an address database, and an address cache associated with an address of an addressee corresponding to the first e-mail message;
displaying said address in conjunction with a perceptive cue in response to said indicator being set;
wherein, when said indicator is set, said indicator is operable for clearing in response to said address becoming accessible;

programming instructions for clearing said indicator in response to subsequently receiving a second e-mail message originating from the address of the addressee corresponding to the first e-mail message, wherein the second e-mail message does not correspond to the first e-mail message; and clearing said indicator in response to the expiration of a preselected time interval corresponding to a difference between a current time and a time corresponding to the setting of the setting of the indicator.

3. A data processing system comprising: circuitry operable for, when a failed delivery message, corresponding to a first e-mail message, is received, setting an indicator in an entry in one of an address book, an address database, and an address cache associated with an address of an addressee corresponding to the first e-mail message;

circuitry operable for displaying said address in conjunction with a perceptive cue in response to said indicator being set;

wherein, when said indicator is set, said indicator is operable for clearing in response to said address becoming accessible; and circuitry operable for:

clearing said indicator in response to subsequently receiving a second e-mail message originating from the address of the addressee corresponding to the first e-mail message, wherein the second e-mail message does not correspond to the first e-mail message; and clearing said indicator in response to the expiration of a preselected time interval corresponding to a difference between a current time and a time corresponding to the setting of the setting of the indicator.

4. The method of claim 1, further comprising:

caching a third email message corresponding to the first e-mail message;

and transmitting the third email message in response to the clearing said indicator.

5. Computer program product of claim 2, further comprising:

caching a third email message corresponding to the first e-mail message;

and transmitting the third email message in response to the clearing said indicator.

6. The data processing system of claim 3, further comprising:

caching a third email message corresponding to the first e-mail message;

and transmitting the third email message in response to the clearing said indicator.

* * * * *